J. W. HARBAUGH, DEC'D.
C. HARBAUGH, ADMINISTRATRIX.
AUTOMOBILE CLUTCH STABILIZER AND CONTROL SILENCER.
APPLICATION FILED FEB. 24, 1920.
1,390,954. Patented Sept. 13, 1921.
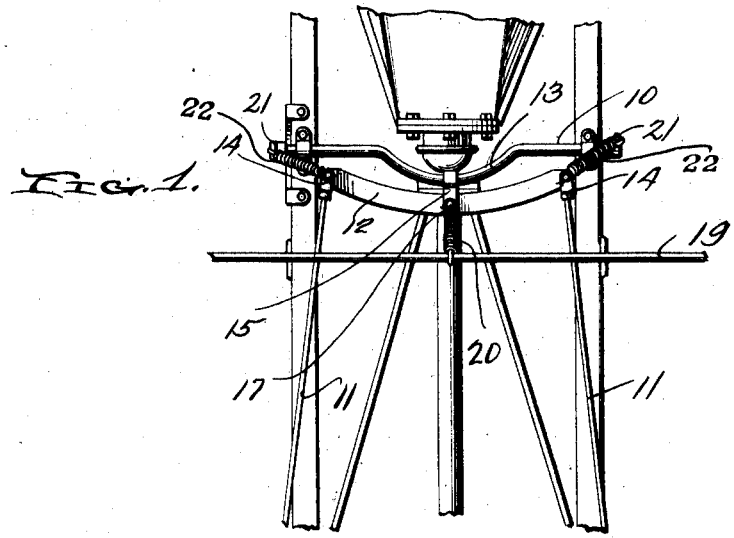
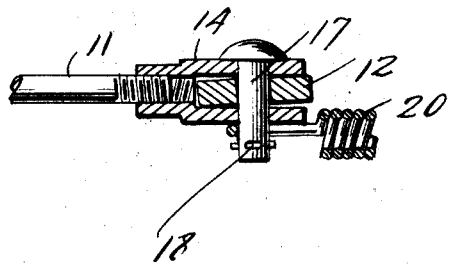
Inventor
John W. Harbaugh
By
Attorneys

UNITED STATES PATENT OFFICE.

JOHN W. HARBAUGH, OF CORYDON, INDIANA; CORA HARBAUGH ADMINISTRATRIX OF SAID JOHN W. HARBAUGH, DECEASED.

AUTOMOBILE CLUTCH-STABILIZER AND CONTROL-SILENCER.

1,390,954. Specification of Letters Patent. Patented Sept. 13, 1921.

Application filed February 24, 1920. Serial No. 360,631.

*To all whom it may concern:*

Be it known that I, JOHN W. HARBAUGH, a citizen of the United States, residing at Corydon, in the county of Harrison, State of Indiana, have invented certain new and useful Improvements in Automobile Clutch-Stabilizers and Control-Silencers; and I do hereby declare the following to be a full, clear, and exact description of the invention, such as will enable others skilled in the art to which it appertains to make and use the same.

This invention relates to new and useful improvements in automobile brake mechanisms and particularly to devices for stabilizing the clutches and rendering the control mechanism practically noiseless.

One object of the present invention is to provide a novel and improved device of this character which is especially adapted for use on Ford automobiles, to prevent rattling of the brake rods.

Another object is to provide a novel and improved device of this character which can be easily and quickly applied to the Ford automobile without modifications to the brake mechanism, and which will render the movements of the control levers and pedals practically noiseless.

Other objects and advantages will be apparent from the following description when taken in connection with the accompanying drawing.

In the drawing:

Figure 1 is a bottom plan view of a portion of the brake mechanism of a Ford automobile showing the invention in position.

Fig. 2 is a vertical sectional view taken through the brake rod and the bar to show the connection therebetween.

Referring particularly to the accompanying drawing, 10 represents the transverse shaft, to the ends of which are ordinarily connected the brake rods or links 11. In the present instance, these links are connected to the opposite ends of a longitudinally bowed bar 12, which extends transversely of the automobile, and beneath the shaft 10, and directly below the crank portion 13 thereof. Straddling the ends of the bar 12 are the clevises 14 of the brake rods or links 11. Embracing the central crank portion 13 of the shaft 10 is a U-shaped member 15, the legs of which are disposed in straddling relation to the central portion of the bar 12, a pin 17 being disposed through the said legs and bar and a cotter pin 18 disposed through one end of said pin 17.

Connected to the pin 17, and to the center of the transverse bar 19 of the running-board support, is a strong coil spring 20, which exerts a backward pull on the bar 12, and the crank of the shaft 10, with the result that the parts have no tendency to rattle or chatter. This produced a slight cant to the bar 12 so that its ends are wedged, to a certain extent, within the bifurcations of the clevises 14, as clearly seen in Fig. 2 of the drawing.

Connected to each brake rod, adjacent its clevis, and to a radially extending arm 21 at each end of the shaft 10, are coil springs 22, which exert an outward pull on the brake rods or links so as to hold the same from rattling, and thus preventing any tendency toward looseness between the ends of the bar 12 and the clevises 14.

It will thus be seen that there is provided a novel and improved means whereby the clutch mechanism is held in a stabilized condition, and the control prevented from rattling noises.

Furthermore, the springs serve to hold the brake lever from jolting backward, during the movement of the automobile, and getting into neutral position, with the consequent slipping of the clutch and the racing of the engine and loss of power thereof.

What is claimed is:

The combination with the cranked brake shaft of an automobile and the bifurcated brake rod clevises, of a longitudinally curved and flat bar disposed in parallel relation to the brake shaft, a loop secured centrally to the bar and loosely engaged with the crank of the said shaft, a spring secured to the loop and a portion of the automobile whereby to exert a rearward pull on the bar to maintain the brake shaft against loose play and to produce a slight cant to the bar whereby to induce a wedging action between the ends thereof and the brake rod clevises, and springs connected to the brake rods and to the automobile at the sides thereof.

In testimony whereof I affix my signature in the presence of two witnesses.

JOHN W. HARBAUGH.

Witnesses:
FRANK E. DREFISH,
HUGH RHODES.